United States Patent
Kubik et al.

(10) Patent No.: US 10,291,663 B2
(45) Date of Patent: May 14, 2019

(54) METHODS AND APPARATUS FOR IMPLEMENTING A COMMUNICATION BARRING SERVICE

(71) Applicant: Telefonaktiebolaget L M Ericsson (publ), Stockholm (SE)

(72) Inventors: Michal Kubik, Stockholm (SE); Andreas Anulf, Lidingö (SE); Qi Yuan Feng, Stockholm (SE); Thomas Hansén, Södertälje (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 339 days.

(21) Appl. No.: 14/903,472

(22) PCT Filed: Jul. 8, 2013

(86) PCT No.: PCT/EP2013/064385
§ 371 (c)(1),
(2) Date: Jan. 7, 2016

(87) PCT Pub. No.: WO2015/003735
PCT Pub. Date: Jan. 15, 2015

(65) Prior Publication Data
US 2016/0149965 A1 May 26, 2016

(51) Int. Cl.
*H04L 29/06* (2006.01)

(52) U.S. Cl.
CPC ...... *H04L 65/1089* (2013.01); *H04L 65/1006* (2013.01); *H04L 65/1016* (2013.01); *H04L 65/1063* (2013.01); *H04L 65/1096* (2013.01)

(58) Field of Classification Search
CPC ............ H04L 65/1016; H04L 65/1096; H04L 65/1006; H04L 65/1063; H04L 41/0686; H04L 65/1089
See application file for complete search history.

(56) References Cited

U.S. PATENT DOCUMENTS

2010/0041398 A1* 2/2010 Sand .................. H04W 8/20
455/433
2011/0134804 A1* 6/2011 Maes .................. H04M 7/0012
370/259

(Continued)

FOREIGN PATENT DOCUMENTS

CN 1853399 A 10/2006

OTHER PUBLICATIONS

3GPP, TS 24.611 v. 10.2, Jan. 2012.*

(Continued)

*Primary Examiner* — Jae Y Lee
*Assistant Examiner* — Aixa A Guadalupe Cruz
(74) *Attorney, Agent, or Firm* — Murphy, Bilak & Homiller, PLLC

(57) ABSTRACT

A method of implementing a Communication Barring, CB, service within an IP Multimedia Subsystem, IMS, network in respect of an ongoing IMS session or an IMS session in early session phase. The method comprises, at an Application Sever, AS, within the IMS network, parsing SIP messages relating to the session to detect an attempt to add one or more media streams to the session. CB service rules are applied to determine the allowability of the media stream(s) being added. If the media stream(s) being added is (are) not allowed, action is taken to prevent its addition, and otherwise allowing the media stream addition to proceed.

16 Claims, 4 Drawing Sheets

(56) References Cited

U.S. PATENT DOCUMENTS

2011/0217966 A1* 9/2011 McDonald .............. H04M 3/42
455/416
2012/0300677 A1* 11/2012 Forsberg ............. H04L 65/1016
370/261

OTHER PUBLICATIONS

3GPP, "3rd Generation Partnership Project; Technical Specification Group Core Network and Terminals; Call Barring (CB) supplementary service; Stage 3 (Release 11)", 3GPP TS 24.088 V11.0.0 (Sep. 2011) Sep. 2009, 1-16.

3GPP, "3rd Generation Partnership Project; Technical Specification Group Core Network and Terminals; Anonymous Communication Rejection (ACR) and Communication Barring (CB) using IP Multimedia IM) Core Network (CN) subsystem; Protocol specification (Release 11)", 3GPP TS 24.611 V11.2.0 (Sep. 2012), Sep. 2012, 1-26.

3GPP, "3rd Generation Partnership Project; Technical Specification Group Services and System Aspects; IP Multimedia Subsystem (IMS); Stage 2 (Release 12)", 3GPP TS 23.228 V12.1.0 (Jun. 2013), Jun. 2013, 1-296.

3GPP, "3rd Generation Partnership Project; Technical Specification Group Services and System Aspects; Network architecture (Release 12)", 3GPP TS 23.002 V12.2.0 (Jun. 2013), Jun. 2013, 1-105.

Ahmad, A. et al., "Event Notification Management Information Base for Data over Cable Service Interface Specifications (DOCSIS)—Compliant Cable Modems and Cable Modem Termination Systems", The Internet Society Jun. 2006 Network Working Group Request for Comments: 4547 Category: Standards Track, Jun. 2006, 1-40.

ETSI, "Digital cellular telecommunications system (Phase 2+); Universal Mobile Telecommunications System (UMTS); LTE; Anonymous Communication Rejection (ACR) and Communication Barring (CB) using IP Multimedia (IM) Core Network (CN) subsystem; Protocol specification", ETSI TS 124 611 V10.0.0 (Mar. 2011), Mar. 2011, 1-24.

ETSI, Digital cellular telecommunications system (Phase 2+); Universal Mobile Telecommunications System (UMTS); LTE; Common Basic Communication procedures using IP Multimedia (IM) Core Network (CN) subsystem; Protocol specification (3GPP TS 24.628 version 10.2.0), ETSI TS 124 628 V10.2.0 (Apr. 2011), Apr. 2011, 1-59.

Schulzrinne, H. et al., "Common Policy: A Document Format for Expressing Privacy Preferences", Network Working Group Request for Comments: 4745, Feb. 2007, 1-33.

* cited by examiner

METHODS AND APPARATUS FOR IMPLEMENTING A COMMUNICATION BARRING SERVICE

TECHNICAL FIELD

The present invention relates to methods and apparatus for implementing a communication barring services in the context of an IP Multimedia Subsystem.

BACKGROUND

IP Multimedia Subsystem (IMS) is the technology defined by the Third Generation Partnership Project (3GPP) to provide IP Multimedia services over mobile communication networks. The architecture and general features of the IMS are described generally in 3GPP specification TS 23.002 and, in more detail, in TS 23.228. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. Other protocols are used for media transmission and control, such as Real-time Transport Protocol and Real-time Transport Control Protocol (RTP/RTCP).

The IMS is logically structured into a so-called "core network" layer and a so-called "service layer". The core network layer is implemented by functional entities which are briefly described below. The service layer essentially comprises "Application Servers" arranged to provide services to user terminals (referred to hereinafter as User Equipment (UE)). These Application Servers are connected via the IMS, and/or arranged to mediate in the provision of services by executing specific service-based logic, such as to divert an incoming multimedia session in certain circumstances.

The current IMS standards provide for Communication Barring (CB) services to allow networks to control subscriber access to services. The present state of the 3gpp-standardized CB services in IMS is described in 3GPP TS 24.611. This standard follows and extends the basic principles for call restriction supplementary services in Circuit Switched (CS) and Packet Switched (PS) networks considered in TS 24.088.

TS 24.611 describes in particular the actions of an IMS AS executing CB services on a session initiation request in the event that the request meets the requirements of the CB service provisioned in the profile of the subscriber of the CB service. These service requirements are defined in terms of rules with conditions and actions, which are also defined by the same specification with further references to RFC 4745. In particular, TS 24.611 defines an Incoming Communication Barring (ICB) service that is a service that rejects incoming communications that fulfil certain provisioned or configured conditions on behalf of the terminating user, and an Outgoing Communication Barring (OCB) that is a service that rejects outgoing communications that fulfil certain provisioned or configured conditions on behalf of the originating user. FIG. 1 illustrates this functional architecture schematically, assuming a session being established between two subscribers, UE-A and UE-B, with UE-A being the originating party and UE-B being the terminating party.

The existing specifications do not contain any provisions (relevant to ICB or OCB) for user scenarios other than session initiation. The current approach may create an opportunity for subscribers to circumvent CB services in certain circumstances.

SUMMARY

It is an object of the present invention to overcome or at least mitigate the CB related problems discussed above. This and other objects are achieved by causing an IMS AS to parse SIP messages in respect of an ongoing IMS session or an IMS session in early session phase in order to identify and control media changes and additions for the session.

According to a first aspect of the present invention there is provided a method of implementing a Communication Barring, CB, service within an IP Multimedia Subsystem, IMS, network in respect of an ongoing IMS session or an IMS session in early session phase. The method comprises, at an Application Sever, AS, within the IMS network, parsing SIP messages relating to the session to detect an attempt to add one or more media streams to the session. CB service rules are applied to determine the allowability of the media stream(s) being added. If the media stream(s) being added is (are) not allowed, action is taken to prevent its addition, and otherwise allowing the media stream addition to proceed.

Embodiments of the invention may be employed to protect subscribers and/or network operators against fraud and inappropriate charging.

An action that may be taken in the event that a media stream is not allowed might comprise rejecting the request at the AS.

In the case where said message is a SIP PRACK request relating to an IMS session in early session phase, the action may comprise removing an unallowed media offer from the SIP PRACK request in the upstream direction and forwarding the request to its destination User Agent, and rejecting the media stream in a response in the downstream direction.

The SIP message may be a reliable SIP response and said action may comprise disabling the individual unallowed media stream in the SIP response before forwarding.

The CB service rules may be applied to SIP messages that contain a Session Description Protocol, SDP, offer.

The CB service rules may be the same rules that are applied during initiation of the session.

The method may comprise applying only those CB service rules that contain at least one media condition.

The method may comprise storing session parameters from the request and any related response(s) that initiated the ongoing IMS session, and subsequently using these session parameters when applying CB service rules to determine the allowability of the media stream(s) being added.

According to a second aspect of the present invention there is provided an Application Server, AS, for implementing a Communication Barring, CB, service within an IP Multimedia Subsystem, IMS, network in respect of an ongoing IMS session or an IMS session in early session phase. The apparatus comprises a SIP message parser for parsing SIP messages relating to the session to detect an attempt to add one or more media streams to the session, and a policy unit for applying CB service rules to determine the allowability of the media stream(s) being added. The apparatus further comprises a policy enforcement unit configured, if the media stream(s) being added is (are) not allowed, to take action to prevent its addition, and otherwise to allow the media stream addition to proceed.

The policy unit may be configured to apply only those CB service rules that contain at least one media condition.

The policy enforcement unit may be configured to take said action by one of:
rejecting a SIP message containing an unallowed request;
disabling unallowed media streams that were added or modified in a media offer received in a reliable response;
removing completely the media offer containing unallowed media stream(s) in a SIP PRACK.

The Application Server may further comprise a data recorder for storing session parameters from the request and any related response(s) that initiated the ongoing IMS session, said policy unit being configured to use these session parameters when applying CB service rules to determine the allowability of the media stream(s) being added.

DETAILED DESCRIPTION

As has already been considered above, in the context of the IP Multimedia Subsystem (IMS), 3GPP TS 24.611 and TS24.088 describe Communication Barring (CB) services including Outgoing CB (OCB) and Incoming CB (ICB) services. However, the only user scenario contemplated by the state of the art is that of session initiation, i.e. the implementation of CB services during initiation of an IMS session. It is recognised here that it may be possible to bypass call restrictions from CB services via session updates occurring during a session (and also during an early session phase), and originating either from the originating or the terminating User Agent (UA). This is particularly relevant for session updates that manipulate media used in the session. The consequences of this include, inter alia, a threat to premium services offered to subscribers, e.g. a subscriber may establish and pay for a voice call and subsequently add "free" video during the call, and the possibility that subscribers may be exposed to excessive charging for services that cannot be blocked using CB. Considering this latter issue further, this may be problematic when for example a corporation is responsible for paying a telephone bill and does not allow its employees to make video calls (because they induce extra changes or for security reasons). It may also arise when a private subscriber wants to prevent making/receiving or being upgraded to (in some countries receiving calls are charged too) video calls when roaming due to extra charges, or when he or she wants to avoid using certain services at peak times.

Figure 1:
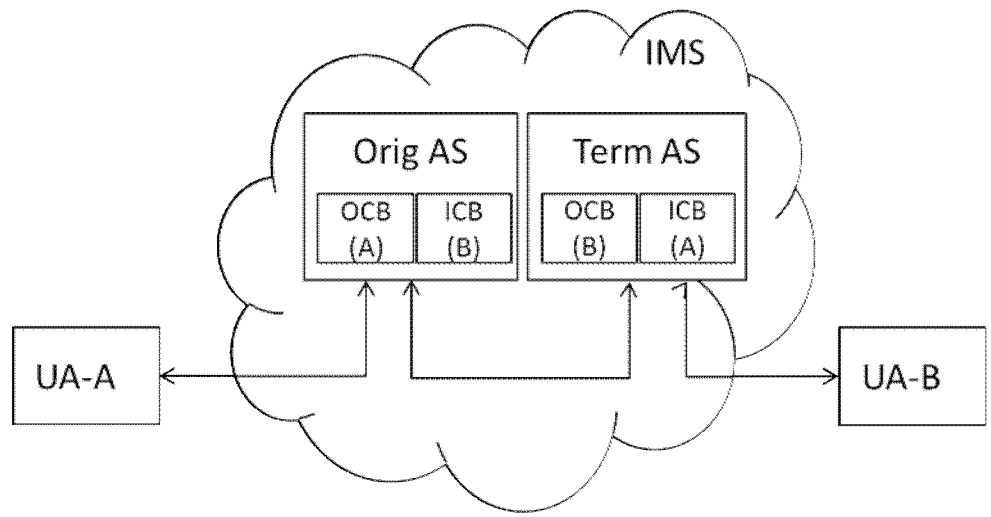
FIG. 1 illustrates schematically originating and termination Communication Barring services implemented within the IMS.
Figure 2:
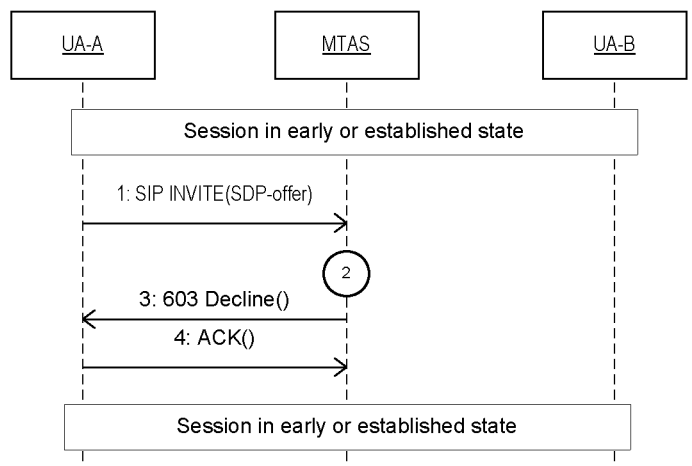
FIG. 2 illustrates signalling relating to a communication session update in an early session phase or an established session phase, employing a SIP UPDATE.
Figure 3:
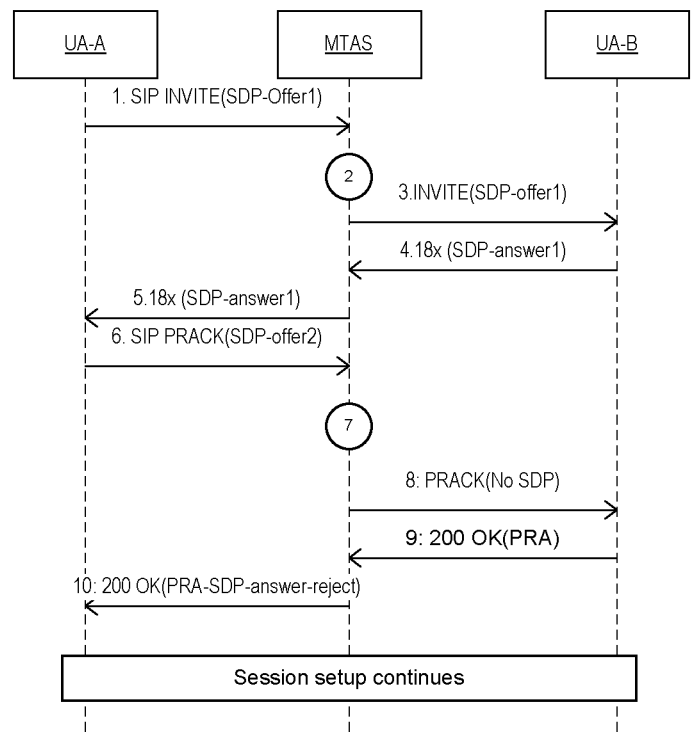
FIG. 3 illustrates signalling relating to a communication session update in an early session phase or an established session phase, employing a SIP PRACK.
Figure 4:
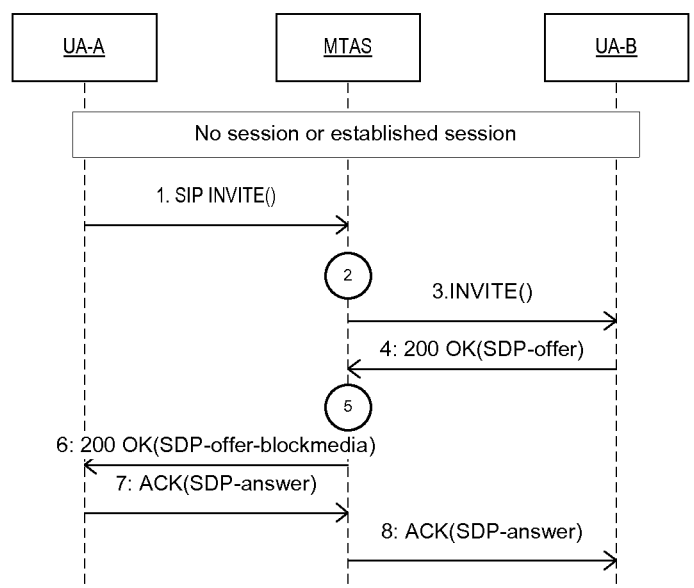
FIG. 4 illustrates signalling relating to a communication session update in an early session phase or an established session phase, where one of the User Agents includes a media description in a "reliable response" within the session, this description constituting a media offer.

A communication session update can take place in an early session phase or an established session phase through two principal operations. Firstly, one of the participating user agents (UA) can generate a SIP request within the session in order to refresh the session or to change the session parameters. This can be done for example by means of a SIP INVITE as illustrated in FIG. 2 (or using a SIP UPDATE in place of the INVITE), or using a SIP PRACK as illustrated in FIG. 3. In the Figures, the MTAS is a Multimedia Telephony Application Server configured to implement the CB service on behalf of UE-A. The MTAS is a specific implementation of the MMTel AS. A second approach involves one of the User Agents including a media description in a "reliable response" within the session, this media description constituting a media offer. This is illustrated in FIG. 4.

It is proposed to address this problem using an extension of the existing CB services rather than developing a new service specific for the purpose. This offers two advantages, namely:

(1) Inclusion of the new functionality into existing solutions with CB (e.g. MMTel Simulated Services) is relatively straightforward.

(2) The extended service can reuse the already existing (standardized) communication rules intended for barring session initiation, albeit with some modification in applicability. This is particularly attractive as it can be expected that the rules applicable for session initiation should be enforced for the entire session lifetime, i.e. there is unlikely to be a requirement for a first set of rules during session initiation and a second, different set of rules for the remainder of the session lifetime.

In order to determine if CB services with Restricted Media Enforcement (RME) should bar a session update, the message used to order the session update must be surveyed at the relevant AS, e.g. at the MTAS. It is important that RME must only be activated on media streams that are being added or modified by the media offer. If this is not the case, there is a risk that a successfully negotiated ongoing session could be disrupted by the intervention of CB services, or that other services could be affected. Furthermore, it is important that CB services do not interfere with other session signalling, as any such interference might otherwise impact on services.

When CB service with RME is triggered in an AS, it will apply the standard rule-set defined for this service and provisioned for the served subscriber. However, evaluation of conditions from the standard rules is not trivial for user scenarios associated with session updates.

A first point to note is that the rule-set must be filtered so that only rules which constitute media restrictions are applied. In terms of RFC 4547, this means that the rule must contain at least one <media> condition. Furthermore, in contrast with CB for session initiation, CB for session update must track and store session context in order to be able to evaluate the standard rule conditions. This arises for the following reasons:

1) Session parameters needed to evaluate conditions may not have the right content or format in the message(s) triggering a session update.
2) Session updates may be triggered by the recipient of the communication session, in which case the set of CB services executed in the AS node is reversed, i.e. ICB is executed where OCB was executed previously and vice versa.

Of the already standardized CB conditions, at least the following conditions must be evaluated using session context stored during session initiation:
<identity>
<other-identity>
<anonymous>
<communication-diverted>
<roaming>
<international>
<international-exHC>
<external-list>

When a CB service (implemented within a given AS) determines that a session update shall be barred, and the session update has been received in a SIP request other than a PRACK (e.g. INVITE or UPDATE), the service can do so simply by rejecting that request according to existing standards. An exception is when the session update to be barred has been ordered in a reliable SIP response (FIG. 4). In this case, it is most efficient for the AS to forward the reliable response after disabling the media streams (requested in the offer) that are restricted by the provisioned CB rules. The benefit is that the previously successfully negotiated session continues without interruption. A disadvantage is that the session update initiator is not notified of the restriction. If such a notification is necessary, the issue must be addressed separately. Disabling a media stream in a media offer is defined in RFC 3264 as setting the port attribute of the stream's media line to "0". In order to disable restricted media in an offer, the CB service must consider the complete set of rules applicable for session update (described above) and disable each media stream which was added or modified and whose media type matches types from the media conditions in any matching rules.

When the session update to be barred has been ordered in a PRACK (FIG. 3), the AS shall remove the media offer from the PRACK request when it is forwarded by the AS. In a 200 OK response to the PRACK, the AS should send a media answer in which all media streams are disabled in order to signal back to the UA that the offer has been rejected. This means of handling the media offer with restricted media in PRACK is preferable to disabling media streams and is analogous to the media offer handling in the reliable answer.

Figure 5:
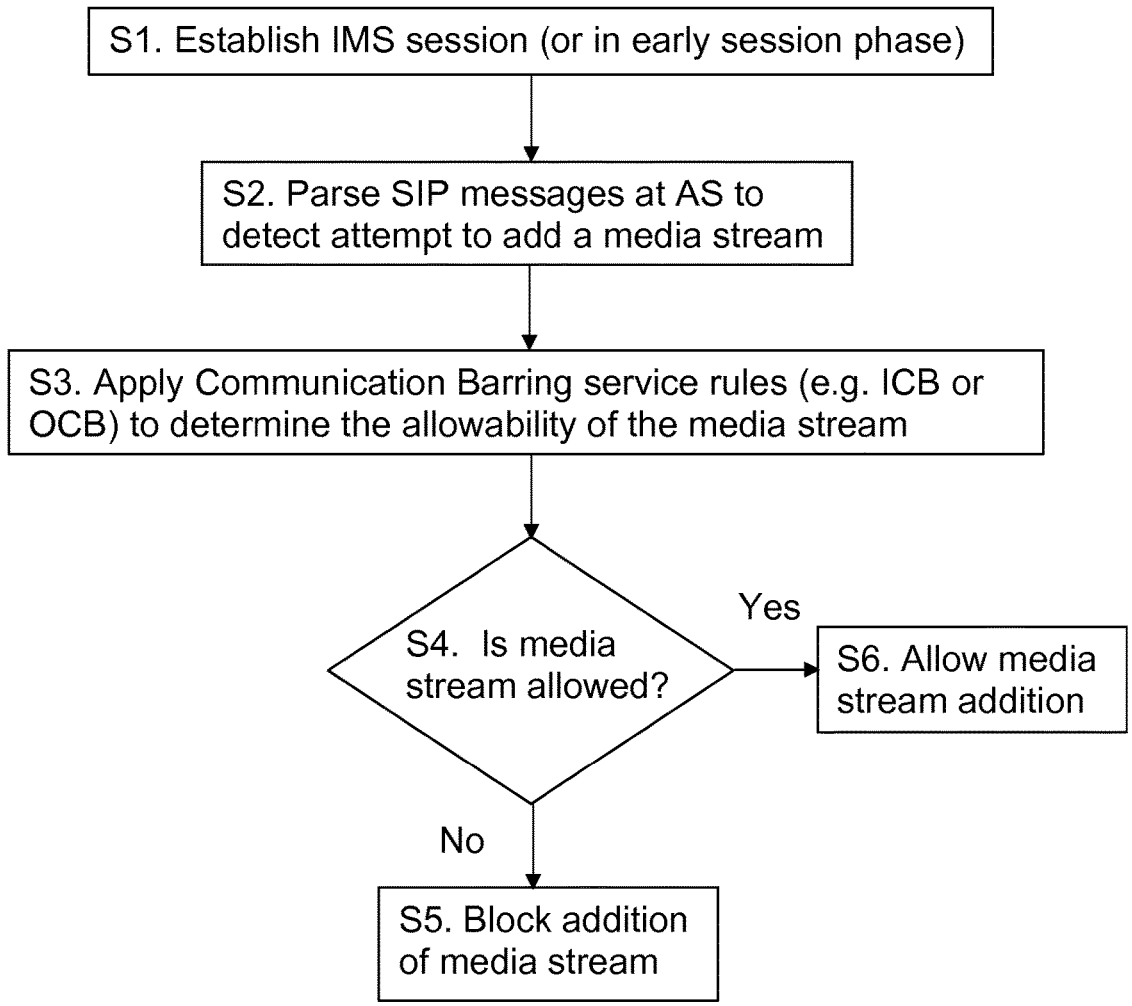
FIG. 5 is a flow diagram illustrating an implementation of a CB service for a communication session update in an early session phase or an established session phase.

FIG. 5 is a flow diagram further illustrating this approach to implementing a Communication Barring, CB, service within an IP Multimedia Subsystem, IMS, network in respect of an ongoing IMS session or an IMS session in early session phase. Following initiation of the session (S1), an IMS Application Sever, AS, parses SIP messages relating to the session to detect an attempt to add one or more media streams to the session (S2). The CB service implemented within the AS applies CB service rules to determine the allowability of the media stream(s) being added (S3,S4). If the media stream(s) being added is (are) not allowed, action is taken to prevent its addition (S5), and otherwise the media stream addition is allowed to proceed (S6).

Figure 6:
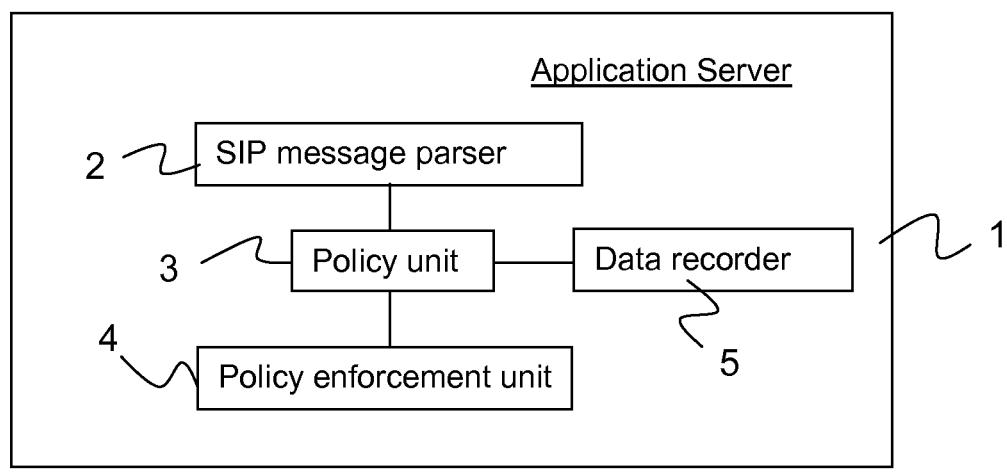
FIG. 6 illustrates schematically an IMS Application Server configured to implement a CB service in line with FIG. 5.

Considering now FIG. 6, this illustrates schematically an IMS Application Server 1. This AS may be an MMTel AS configured to provide IMS multimedia telephony services to subscribers. The AS will comprise certain standard functionality in order to implement the required services, and the components associated with this functionality are not shown in FIG. 6. Only components associated with the new CB service functionality are illustrated. These components include a SIP message parser 2 which may be a standalone entity or may comprise an extension to an existing message parser. The SIP message parser is configured to parse SIP messages relating to an established session or session in early session phase in order to detect an attempt (by one of the UAs) to add one or more media streams to the session. The AS further comprises a policy unit 3 for applying CB service rules to determine the allowability of the media stream(s) being added, and a policy enforcement unit 4 configured, if the media stream(s) being added is (are) not allowed, to take action to prevent its addition, and otherwise to allow the media stream addition to proceed.

FIG. 6 further illustrates a data recorder 5 for storing session parameters from the request and any related response(s) that initiated the ongoing IMS session. The policy unit 3 is able to access the stored data and to use it when applying CB service rules to determine the allowability of the media stream(s) being added.

The AS of FIG. 6 may be implemented using a combination of processors, data memories, and software code memories. The software will be configured to implement the functionality described above. Separate processors and memory may be provided for each of the functional components shown in FIG. 6.

It will be appreciated by the person of skill in the art that various modifications may be made to the above described embodiments without departing from the scope of the invention.

The invention claimed is:

1. A method of implementing a Communication Barring (CB) service at an Application Server (AS) within an IP Multimedia Subsystem (IMS) network in respect of an initiated IMS session, the method comprising:
   detecting, based on parsing Session Initiation Protocol (SIP) messages relating to the initiated IMS session comprising a first media stream, an attempt to update the initiated IMS session by adding one or more further media streams;
   performing the following operations with respect to each particular media stream of the one or more further media streams:
      applying CB service rules to determine the allowability of adding the particular media stream;
      if not allowable, taking action to prevent the addition of the particular media stream; and
      if allowable, allowing the addition of the particular media stream to proceed;
   wherein the first media stream is not disrupted by performing the operations with respect to the one or more further media streams.

2. The method according to claim 1, wherein said SIP messages are SIP UPDATE and or REINVITE messages relating to the initiated IMS session.

3. The method according to claim 2, wherein said action comprises rejecting the request at the AS.

4. The method according to claim 1, wherein said SIP messages comprise a SIP PRACK request relating to an IMS session in early session phase.

5. The method according to claim 4, wherein said action comprises removing an un-allowed media offer from the SIP PRACK request in the upstream direction and forwarding the request to its destination User Agent, and rejecting the associated media stream in a response in the downstream direction.

6. The method according to claim 1, wherein said SIP messages comprise a reliable SIP response and said action comprises disabling the particular un-allowed media stream in the SIP response before forwarding.

7. The method according to claim 1, wherein the CB service rules are applied to SIP messages that contain a Session Description Protocol (SDP) offer.

8. The method according to claim 1, wherein said CB service rules are further applied to the first media stream during the initiation of the IMS session.

9. The method according to claim 1, wherein said CB service rules have been obtained by the AS in respect of a given IMS subscriber from a Home Subscriber Server (HSS).

10. The method according to claim 1, wherein applying CB service rules comprises applying only those CB service rules that contain at least one media condition.

11. The method according to claim 1, further comprising:
storing session parameters from the request and any related responses during the initiation of the IMS session, and
subsequently using the stored session parameters when applying CB service rules to determine the allowability of the one or more media streams being added.

12. An Application Server (AS) for implementing a Communication Barring (CB) service within an IP Multimedia Subsystem (IMS) network in respect of an initiated IMS session, the apparatus comprising:
a SIP message parser configured to detect, based on parsing Session Initiation Protocol (SIP) messages relating to the initiated IMS session comprising a first media stream, an attempt to update the initiated IMS session by adding one or more further media streams;
a policy unit configured to apply CB service rules to determine the allowability of adding each of the one or more further media streams; and
a policy enforcement unit configured, responsive to the determination of the allowability of adding the one or more media further streams, to:
take action to prevent the addition of each of the one or more further media streams determined to be not allowable, and
allow to proceed the addition of each of the one or more further media streams determined to be allowable;
wherein the first media stream is not disrupted by the operations performed by the policy unit and policy enforcement unit with respect to the one or more further media streams.

13. The AS according to claim 12, wherein said SIP message parser is configured to identify and parse one or more of SIP INVITE, UPDATE, PRACK, and reliable response messages containing a media offer.

14. The AS according to claim 12, wherein said policy unit is configured to apply only those CB service rules that contain at least one media condition.

15. The AS according to claim 12, wherein said policy enforcement unit is configured to take said action by one of:
rejecting a SIP message containing an un-allowed request;
disabling un-allowed media streams that were added or modified in a media offer received in a reliable response;
removing completely the media offer containing un-allowed media streams in a SIP PRACK.

16. The AS according to claim 12, further comprising a data recorder configured to storing session parameters from the request and any related responses during the initiation of the IMS session, said policy unit being configured to use the stored session parameters when applying CB service rules to determine the allowability of the one or more media streams being added.

* * * * *